S. D. SMITH.
HOUSEHOLD UTENSIL.
APPLICATION FILED MAY 1, 1908.
926,028.
Patented June 22, 1909.
2 SHEETS—SHEET 2.
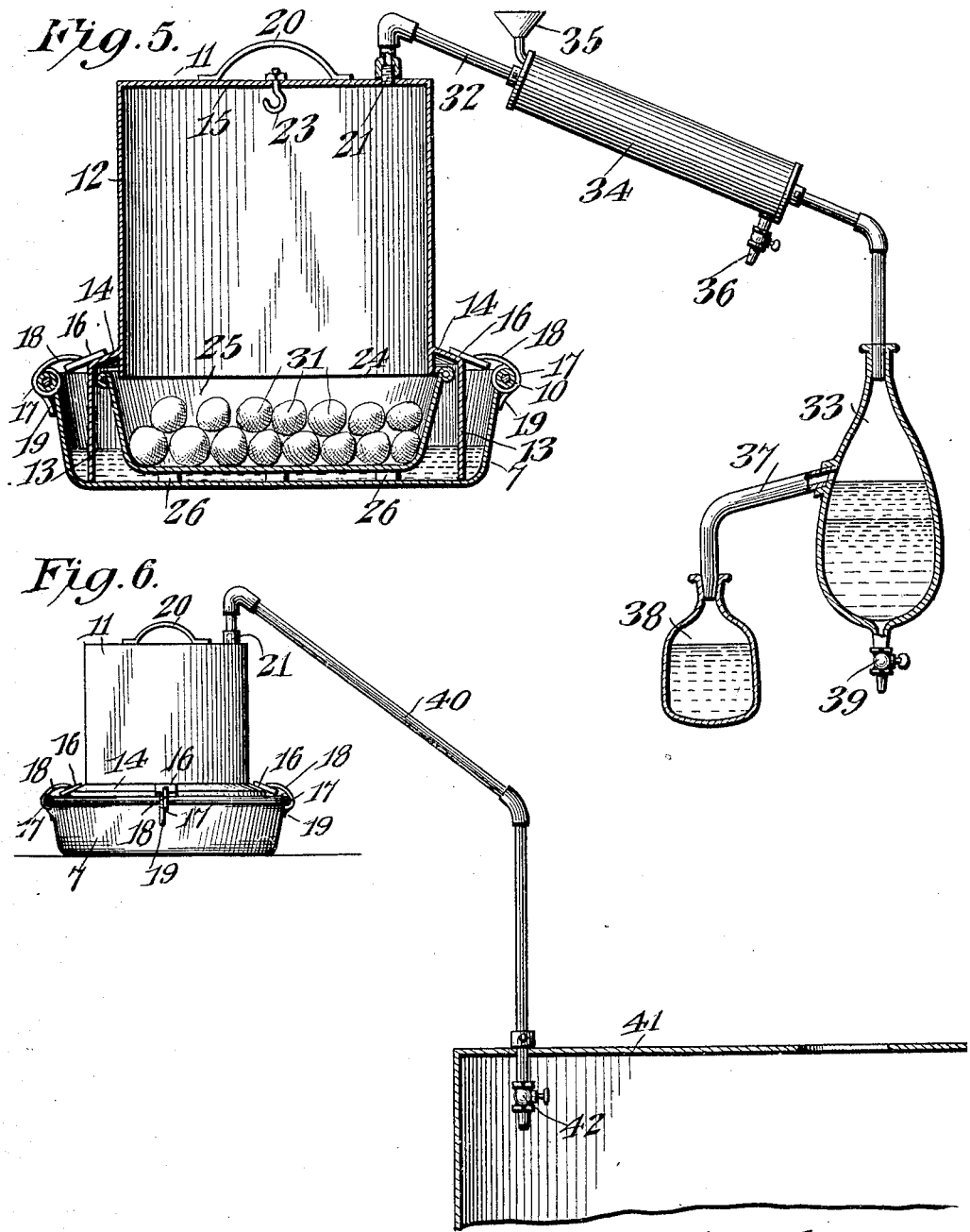
Witnesses
Jas. F. McCathran
B. G. Foster
S. D. Smith, Inventor
By C. G. Siggers
Attorney

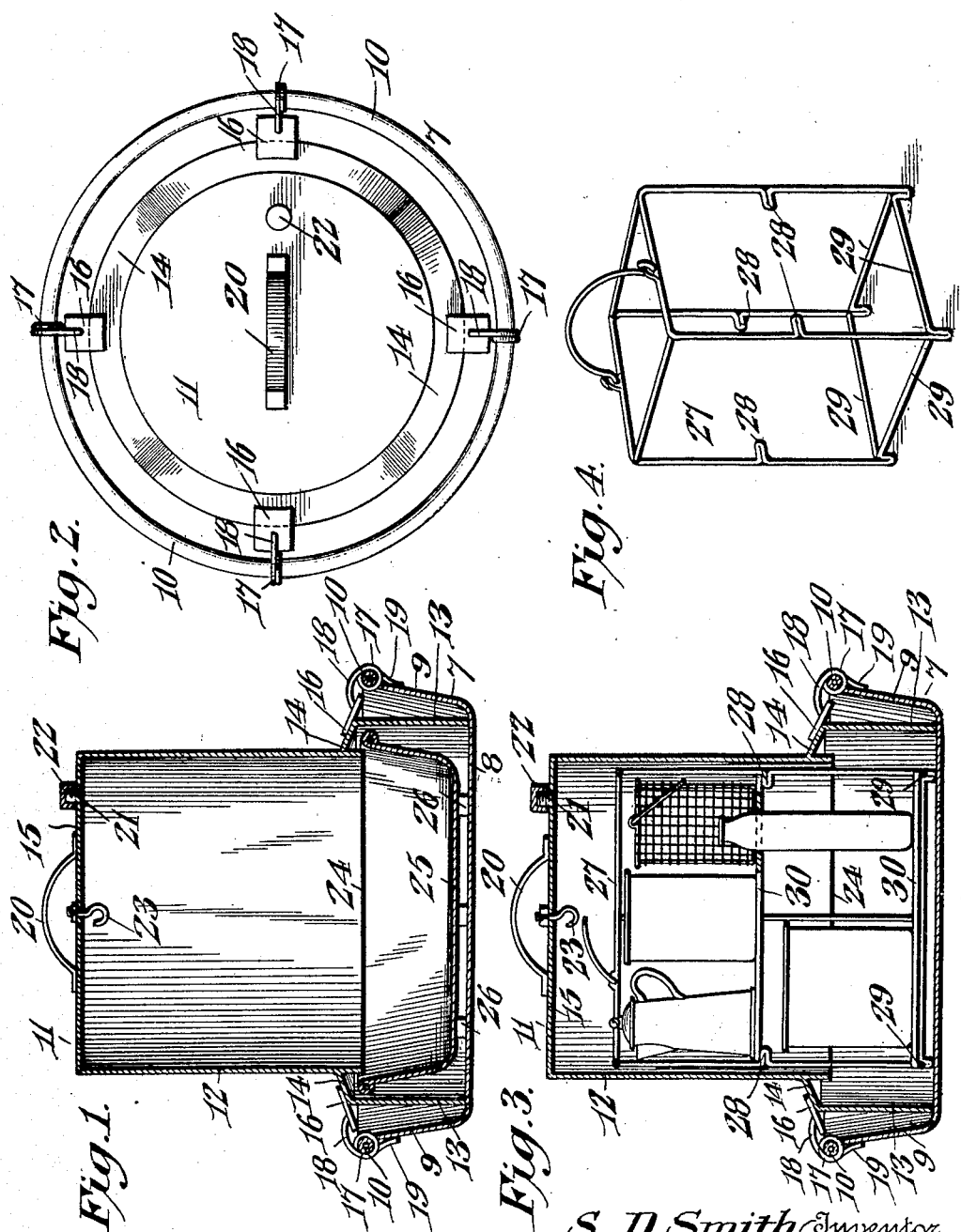

UNITED STATES PATENT OFFICE.

STEPHEN DECATUR SMITH, OF ATLANTA, GEORGIA.

HOUSEHOLD UTENSIL.

No. 926,028.　　　　Specification of Letters Patent.　　　Patented June 22, 1909.

Application filed May 1, 1908. Serial No. 430,405.

*To all whom it may concern:*

Be it known that I, STEPHEN DECATUR SMITH, a citizen of the United States, residing at Atlanta, in the county of Fulton and State of Georgia, have invented a new and useful Household Utensil, of which the following is a specification.

The present invention relates to a utensil, particularly useful for cooking, canning or other domestic purposes, and having a wide range of usefulness.

The principal object of the present invention is to provide a novel, simple structure, which can be cheaply manufactured and can be employed for a variety of purposes, such as cooking food, canning and preserving, sterilizing, obtaining the essential and volatile oils of fruit and other substances, distilling water and producing vapor for baths and the like.

The preferred embodiment of the invention illustrating it in several capacities, is disclosed in the accompanying drawings, wherein:—

Figure 1 is a vertical sectional view through the utensil. Fig. 2 is a top plan view. Fig. 3 is a vertical sectional view, showing the same employed as a cooker. Fig. 4 is a detail perspective view of the supporting frame, illustrated in Fig. 3. Fig. 5 is a sectional view showing the mechanism constituting a part of a still. Fig. 6 is a side elevation of the structure when used for producing vapor for vapor baths.

Similar reference numerals designate corresponding parts in all the figures of the drawings.

In the structure disclosed, a receptacle 7 is provided that is in the form of an open pan or dish having a closed bottom 8, flared side walls 9, and an open top, the side walls having a suitable rim 10. A cover hood 11 is provided, which is preferably cylindrical in form, though it may be angular, and has an upper portion 12 of less diameter than its lower portion 13, the two portions being joined by an intermediate offset wall 14. This cover hood has a closed top 15, and an open bottom, the enlarged portion 13 fitting in the receptacle 7 and resting on the bottom 8 thereof.

The wall 14 carries a plurality of outstanding ears 16, and springs 17, coiled about the rim 10 of the receptacle, are provided with curved arms 18, the terminals of which bear upon the ears 16 to hold the cover hood in place. The springs furthermore have other terminal arms 19 that bear against the outer sides of the receptacle. The top 15 of the cover hood has a handle 20, and also has a threaded pipe coupling 21, which can be closed by a removable cap 22. A hook 23 is also preferably suspended from the top. It will be noted moreover that the upper portion 12 of the hood depends within the lower portion 13, forming a drip flange 24 that terminates short of the bottom and is spaced from the portion 13.

If a ham, fowl or piece of meat is to be steamed, the same is hung from the hook 23 and water is introduced into the receptacle 9, after which the cover hood is placed in position, and locked by means of the spring arms 18. If heat is then applied to the receptacle, it will be evident that the steam produced, will fill the interior of the hood 12, and thus cook the material placed therein. If it is desired to catch the liquid of condensation, a receiving pan 25 can be placed in the lower portion 13 of the hood, its diameter being greater than the diameter of the flange 24, and said receiver being preferably supported by suitable feet 26. Material to be cooked, can also be placed in this receiver, and if the liquid of condensation is not desired, a receptacle of less diameter than the flange 24 can be introduced. With this structure, any material desired can be steamed, and the steam generated, coming in contact with the walls of the hood, surrounded by the cool outer air, will condense, thus creating a partial vacuum in the hood that is beneficial for cooking purposes. In explanation of this, it may be stated that the steam drives out the air under the bottom of the hood and when it is condensed, a partial vacuum is formed as the water seal at the bottom excludes the outer air. To remove the hood, it is only necessary to partially turn the same until the arms 18 disengage from the ears 16, whereupon access can be readily gained to the material cooked.

The apparatus can also be used for cooking a variety of materials at once, or for sterilizing, canning, preserving and the like. In this connection, attention is invited to Figs. 3 and 4, wherein, it will be observed that a rack frame 27 is provided, which can be placed within the hood, and has suitable supports 28 and 29 for shelves 30, on which and in which the containers for the material or materials can be placed. It will of course be understood that these shelves can be varied, as desired to hold cans or receptacles of different kinds.

The structure may also be employed as a still. For instance, in Fig. 5, the same is shown arranged for the extraction of volatile oils from oranges, lemons or other fruit. In this case, the fruit, which is designated by the reference numeral 31, is placed in the receptacle 25, the cap 22 is removed from the coupling, and a pipe 32 connected thereto, this pipe having its discharge end introduced into the end of a suitable receiver 33 for the liquids condensed. A portion of the pipe 32 is inclosed by a water jacket 34, having an inlet funnel 35 connected to its upper end, and a valved discharge nipple 36, projecting from its lower end. The receiver 33 also has an oil conducting pipe 37 connected to one side between its ends and delivering into a bottle or receiver 38. A draw-off cock 39 is preferably connected to the lower portion of the receiver 33. With this construction, it will be evident that the steam and oil vapor produced in the hood 11, will pass through the pipe 32, and will be condensed therein, because of the cold water kept within the condenser jacket 34. The liquid of condensation will be received in the receptacle 33, and as the oil is lighter than the water and will be upon the surface of the latter, when the level rises, the oil will flow into the receiver 38, while the water may be drawn off through the cock 39. It will be clear that this structure as it stands, may be employed for securing distilled water in which case, the water to be distilled is placed in the receptacle 7 and the steam therefrom will be condensed. The pipe 32 can be connected directly to a water cooler.

The structure may also be employed as a vapor generator for vapor bath cabinets, in which case, it is arranged as shown in Fig. 6. A pipe 40 is connected to the coupling 21, and leads to the interior of a bath cabinet 41, the discharge end of the pipe within the cabinet, being provided with a controlling valve 42.

It will be seen that many of the advantages of my invention are due to the fact that the cover-hood is provided with an annularly enlarged portion 13. It will be seen from Fig. 1 that this enlarged portion provides for a pan such as 25, being placed below the contracted portion of the hood, and while yet within the hood, extending out beyond the inside face of the contracted portion. This provides for the collection of the liquor of condensation, and, of course, the collection of the condensed liquid flowing down the walls to the hood 12 is rendered particularly certain by the use of the drip flange 24. It would be impossible to collect this condensed liquid unmixed with a large quantity of water unless a pan could be placed beneath the contracted portion and larger than the same. This particular use of the utensil is particularly valuable in cooking foods, such as Yorkshire pudding, wherein dumplings or bread of one kind or another are placed within the pan 25 and the juices of the meat cooking in the upper portion of the hood are allowed to drop thereon and mingle therewith. It will be obvious that as the pan 9 is filled with water it will be impossible to place the material which is to be moistened by the juices of the meat within the pan 9, and that if the pan 25 had to be smaller than the hood, then a great deal of these juices would be lost. By the construction shown in Fig. 1 no juices are lost at all, and the steam which becomes impregnated with valuable food products is likewise collected and does not again mingle with the water in the pan 9.

From the foregoing, it is thought that the construction, operation and many advantages of the herein described invention, will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a steam cooker, the combination with an outer receptacle having an open top, of a cover-hood of greater height than said receptacle, having an open bottom that fits therein and rests on the bottom of the receptacle, the lower portion of said hood being annularly enlarged, said annular enlargement being of substantially the same height as the outer receptacle, and means on the outer receptacle for engaging with said annular enlarged portion to hold said cover-hood in place.

2. In a steam cooker, the combination with an outer receptacle, having an open top, of a cover-hood having an open bottom that fits within the receptacle and rests on the bottom thereof, the lower portion of said hood being annularly enlarged, said annular enlarged portion being of the same height as the outer receptacle, a drip flange formed at the junction of the upper portion of the hood with the enlarged portion thereof, said drip flange being spaced from the side walls of the lower portion of the hood, and an interior receptacle larger in diameter than the portion of the hood above said drip flange.

3. In a steam cooker, the combination with an outer receptacle having an open top, of a cover-hood of greater height than said receptacle having an open bottom that fits within the receptacle and rests on the bottom thereof, the lower portion of said hood being annularly enlarged, said annular enlargement being of substantially the same height as the outer receptacle and provided with an annular top portion surrounding the upper relatively contracted portion of the hood and joining the enlarged portion to the contracted portion, springs mounted upon the outer receptacle having arms adapted to engage the hood upon the top of the enlarged portion thereof, and an inner vessel of less height than the enlarged portion of the hood and of greater diameter than the upper relatively contracted portion thereof.

4. In apparatus of the character described, the combination with a receptacle having an open top and a rim, of a cover hood having an open bottom that engages in the receptacle and an annularly projecting portion, and springs coiled about the rim, said springs having arms that engage the projecting portion of the cover hood and having arms that bear against the receptacle.

5. In apparatus of the character described, the combination with a receptacle, having a closed bottom and an open top, of a cover hood having an open bottom that fits within the receptacle and rests upon the bottom thereof, the lower portion of said hood being of greater cross sectional area than the upper portion, and said upper portion having a drip flange depending within the lower portion and terminating short of the bottom thereof, outstanding ears carried by the lower portion of the cover hood, springs secured to the receptacle and detachably bearing on the ears, material holding means that rests in the receptacle and extends into the hood, and a pipe coupling carried by the upper end of said hood.

In testimony, that I claim the foregoing as my own, I have hereto affixed my signature in the presence of two witnesses.

STEPHEN DECATUR SMITH.

Witnesses:
 I. PRIES,
 E. B. CAIVAN.